United States Patent
Harrebek et al.

(10) Patent No.: US 11,363,603 B2
(45) Date of Patent: Jun. 14, 2022

(54) DELTA BEAM COMPARISON FOR UL/DL BEAM MISALIGNMENT DETECTION

(71) Applicant: Nokia Technologies Oy, Espoo (FI)

(72) Inventors: Johannes Harrebek, Aalborg (FI); Simon Svendsen, Aalborg (DK); Benny Vejlgaard, Gistrup (DK); Claudio Rosa, Randers (DK); Mark Cudak, Rolling Meadows, IL (US); Fred Vook, Schaumburg, IL (US); Nitin Mangalvedhe, Hoffman Estates, IL (US); Jun Tan, Glenview, IL (US)

(73) Assignee: Nokia Technologies Oy, Espoo (FI)

( * ) Notice: Subject to any disclaimer, the term of this patent is extended or adjusted under 35 U.S.C. 154(b) by 102 days.

(21) Appl. No.: 17/036,717

(22) Filed: Sep. 29, 2020

(65) Prior Publication Data

US 2021/0127379 A1    Apr. 29, 2021

Related U.S. Application Data

(60) Provisional application No. 62/927,162, filed on Oct. 29, 2019.

(51) Int. Cl.
*H04W 4/00* (2018.01)
*H04W 72/04* (2009.01)
*H04W 24/08* (2009.01)

(52) U.S. Cl.
CPC ......... *H04W 72/046* (2013.01); *H04W 24/08* (2013.01)

(58) Field of Classification Search
CPC ............................ H04W 72/046; H04W 24/08
(Continued)

(56) References Cited

U.S. PATENT DOCUMENTS

| 2017/0127400 A1 | 5/2017 | Yu et al. |
| 2018/0191418 A1 | 7/2018 | Xia et al. |

(Continued)

FOREIGN PATENT DOCUMENTS

| AU | 2017404993 A1 | 10/2019 | |
| EP | 3537625 A1 | 9/2019 | |
| WO | WO-2019029562 A1 * | 2/2019 | ............... H04B 7/06 |

OTHER PUBLICATIONS

3rd Generation Partnership Project; Technical Specification Group Radio Access Network; Study on New Radio Access Technology Physical Layer Aspects (Release 14), 3GPP TR 38.802, V14.2.0, Sep. 2017, pp. 1-144.

(Continued)

*Primary Examiner* — Thai D Hoang
(74) *Attorney, Agent, or Firm* — Nokia Technologies Oy

(57) ABSTRACT

In accordance with an example embodiment of the present invention, a method comprising: receiving, by a user equipment of a communication network, a request from a network node to use at least two beam configurations of multiple different beam configurations for the user equipment; measuring, by the user equipment, downlink received power on at least one reference signal using the at least two beam configurations; sending, by the user equipment on an uplink, information of at least two downlink received powers and at least one reference signal using the at least two beam configurations; receiving, by the user equipment, signaling from the network node comprising an indication of beam correspondence assessment from the network node; and adjusting, by the user equipment, uplink beam with reference to a downlink beam based on the received indication of beam correspondence assessment.

20 Claims, 9 Drawing Sheets

(58) Field of Classification Search
USPC .................................. 370/329–330, 335–345
See application file for complete search history.

(56) References Cited

U.S. PATENT DOCUMENTS

| | | |
|---|---|---|
| 2018/0227035 A1 | 8/2018 | Cheng et al. |
| 2018/0227772 A1 | 8/2018 | Yu et al. |
| 2019/0268061 A1 | 8/2019 | Li et al. |
| 2020/0028652 A1* | 1/2020 | Bai ..................... H04L 1/0026 |
| 2020/0120604 A1* | 4/2020 | Nam .................... H04W 76/28 |
| 2021/0127379 A1* | 4/2021 | Harrebek ............ H04B 7/0632 |

OTHER PUBLICATIONS

"3rd Generation Partnership Project; Technical Specification Group Radio Access Network; NR; Physical layer procedures for data (Release 15)", 3GPP TS 38.214, V15.6.0, Jun. 2019, pp. 1-105.

"Pattern Correspondence", 3GPP TSG-RAN WG4 Meeting #90, R4-1900895, Agenda : 6.7.8.3, Fraunhofer HHI, Feb. 25-Mar. 1, 2019, pp. 1-3.

"On Beam Correspondence Optionality", TSG-RAN Plenary meeting #82, RP-182495, Agenda : 9.6, Intel, Dec. 10-13, 2018, 9 pages.

U.S. Appl. No. 62/903,372, "Beam Alignment Verification for Wireless Networks", filed Sep. 20, 2019, 50 pages.

"Verification of Beam Correspondence during Initital Access", TSG-RAN Working Group 4 (Radio) meeting #90, R4-1900431, Agenda : 6.7.8.3.1, Ericsson, Feb. 25-Mar. 1, 2019, 5 pages.

Extended European Search Report received for corresponding European Patent Application No. 20200989.0, dated Mar. 10, 2021, 7 pages.

\* cited by examiner

DELTA BEAM COMPARISON FOR UL/DL BEAM MISALIGNMENT DETECTION

TECHNICAL FIELD

The teachings in accordance with the exemplary embodiments of this invention relate generally to user equipment beam alignment procedure and, more specifically, relate to detection of user equipment UL/DL beam correspondence misalignment.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
RS Reference Signal
CSI-RS Channel State Information Reference Signal
RSRP Reference Signal Received Power
gNB Next Generation Node B
UE User Equipment
UL Uplink
DL Downlink Wireless communications devices may include a plurality of antennas to support advanced communications technologies. For example, data may be received or transmitted via a plurality of antennas to achieve higher robustness and throughput. The plurality of antennas can be referred to for example as an array of antennas. The plurality of antennas may be used for beam forming and can use phases of signals that are shifted at an antenna by an amount. Beamforming techniques can improve signal quality at an intended device while reducing unintended interference to or from other directions by controlling directional pattern of antennas.

Example embodiments of the invention work to support at least such beamforming techniques and provide more efficient approaches for determining misalignments for performing alignment procedure at least associated with such beamforming as are seen to be needed for current radio communication technologies 5G or next generation radio technologies.

SUMMARY

Various aspects of examples of the invention are set out in the claims.

According to a first aspect of the present invention, a method comprising: receiving, by a user equipment of a communication network, a request from a network node to use at least two beam configurations of multiple different beam configurations for the user equipment; measuring, by the user equipment, downlink received power on at least one reference signal using the at least two beam configurations; sending, by the user equipment on an uplink, information of at least two downlink received powers and at least one reference signal using the at least two beam configurations; receiving, by the user equipment, signaling from the network node comprising an indication of beam correspondence assessment from the network node; and adjusting, by the user equipment, uplink beam with reference to a downlink beam based on the received indication of beam correspondence assessment.

According to a second aspect of the present invention, an apparatus comprising: at least one processor; and at least one memory including computer program code, wherein the at least one memory and the computer program code are configured, with the at least one processor, to cause the apparatus to at least: receive a request from a network node to use at least two beam configurations of multiple different beam configurations for the user equipment; measure downlink received power on at least one reference signal using the at least two beam configurations; send, on an uplink, information of at least two downlink received powers and at least one reference signal using the at least two beam configurations; receive signaling from the network node comprising an indication of beam correspondence assessment from the network node; and adjust uplink beam with reference to a downlink beam based on the received indication of beam correspondence assessment.

According to a third aspect of the present invention, A non-transitory computer storage medium encoded with a computer program, the program comprising instructions that when executed by one or more computers cause the one or more computers to perform operations comprising: receiving, by a user equipment of a communication network, a request from a network node to use at least two beam configurations of multiple different beam configurations for the user equipment; measuring, by the user equipment, downlink received power on at least one reference signal using the at least two beam configurations; sending, by the user equipment on an uplink, information of at least two downlink received powers and at least one reference signal using the at least two beam configurations; receiving, by the user equipment, signaling from the network node comprising an indication of beam correspondence assessment from the network node; and adjusting, by the user equipment, uplink beam with reference to a downlink beam based on the received indication of beam correspondence assessment.

According to a fourth aspect of the present invention, a method comprising: sending, by a network node of a communication network, toward a user equipment a request to use at least two beam configurations; receiving, by the network node, from the user equipment information of at least two downlink received powers associated with at least two beam configurations of multiple different beam configurations for the user equipment; measuring, by the network node, uplink received power associated with the at least two beam configurations of the user equipment; and sending, by the network node, towards the user equipment an indication of a beam correspondence assessment determined by the network node and associated with a difference between a determined at least one delta gain of downlink received power using the at least two beam configurations and a determined at least one delta gain of uplink received power using the at least two beam configurations.

According to a fifth aspect of the present invention, an apparatus comprising: at least one processor; and at least one memory including computer program code, wherein the at least one memory and the computer program code are configured, with the at least one processor, to cause the apparatus to at least: send toward a user equipment a request to use at least two beam configurations; receive from the user equipment information of at least two downlink received powers associated with at least two beam configurations of multiple different beam configurations for the user equipment; measure uplink received power associated with the at least two beam configurations of the user equipment; and send towards the user equipment an indication of a beam correspondence assessment determined by the network node and associated with a difference between a determined at least one delta gain of downlink received power using the at least two beam configurations and a determined at least one delta gain of uplink received power using the at least two beam configurations.

According to a sixth aspect of the present invention, A non-transitory computer storage medium encoded with a computer program, the program comprising instructions that when executed by one or more computers cause the one or more computers to perform operations comprising: sending, by a network node of a communication network, toward a user equipment a request to use at least two beam configurations; receiving, by the network node, from the user equipment information of at least two downlink received powers associated with at least two beam configurations of multiple different beam configurations for the user equipment; measuring, by the network node, uplink received power associated with the at least two beam configurations of the user equipment; and sending, by the network node, towards the user equipment an indication of a beam correspondence assessment determined by the network node and associated with a difference between a determined at least one delta gain of downlink received power using the at least two beam configurations and a determined at least one delta gain of uplink received power using the at least two beam configurations.

According to a seventh aspect of the present invention, an apparatus comprising: means for receiving a request from a network node to use at least two beam configurations of multiple different beam configurations for the user equipment; means for measuring downlink received power on at least one reference signal using the at least two beam configurations; means for sending, on an uplink, information of at least two downlink received powers and at least one reference signal using the at least two beam configurations; means for receiving signaling from the network node comprising an indication of beam correspondence assessment from the network node; and means for adjusting uplink beam with reference to a downlink beam based on the received indication of beam correspondence assessment.

According to an eighth aspect of the present invention, an apparatus comprising: means for sending toward a user equipment a request to use at least two beam configurations; means for receiving from the user equipment information of at least two downlink received powers associated with at least two beam configurations of multiple different beam configurations for the user equipment; means for measuring uplink received power associated with the at least two beam configurations of the user equipment; and means for sending towards the user equipment an indication of a beam correspondence assessment determined by the network node and associated with a difference between a determined at least one delta gain of downlink received power using the at least two beam configurations and a determined at least one delta gain of uplink received power using the at least two beam configurations.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In this invention, there is proposed at least a method and an apparatus for a performing a procedure for detection of UE UL/DL beam correspondence misalignment.

The 5G New Radio (NR) Release 15 gNB<->UE Down-Link beam alignment procedure is described in 3GPP TR 38.802 section 6.1.6 and in TS 38.214 section 5.2. The beam alignment procedure includes 3 main phases as described below with reference to FIG. 1.

Figure 1:
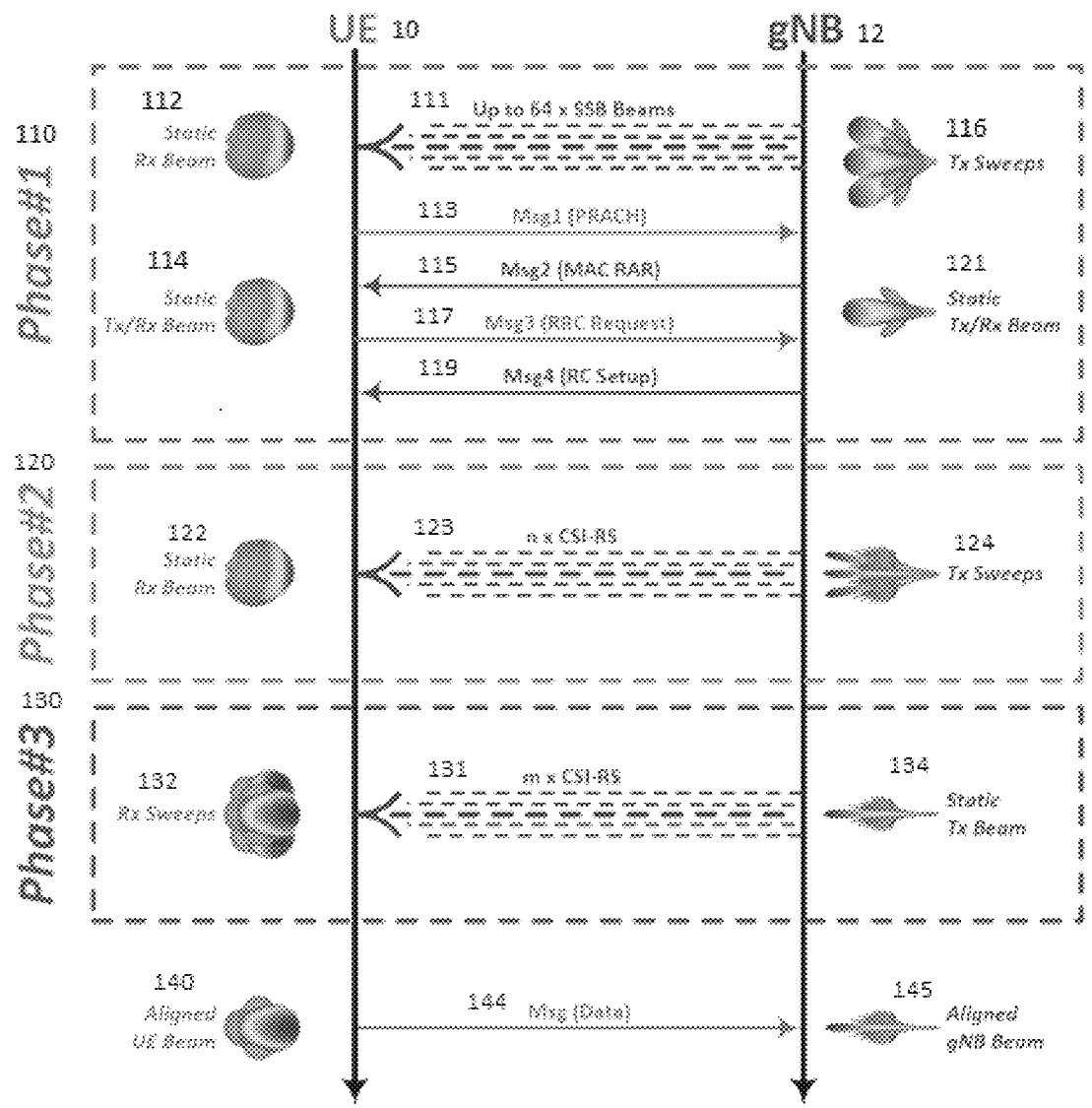
FIG. 1 shows a 3GPP rel15 NR FR2 DL beam alignment procedure.

FIG. 1 shows a 3GPP NR FR2 DL beam alignment procedure.

As shown in FIG. 1 there is a UE 10 and a gNB 12. In FIG. 1 in phase #1 110 the gNB 12 will perform a Tx sweep 116 based on up to 64 different SSB beams 111. The UE 10 operations at this Phase #1 are based on static Rx beam pattern 112 and static pattern 114 as shown in FIG. 1.

Phase #1: in Phase #1 110 as shown in FIG. 1 the UE 10, hereafter referred to as UE, is configured for broad beam RX while gNB is performing DL SSB beam sweeping.

Here the UE measures RSRP for all SSB beams received 112 and communicates back 114 to gNB by transmitting in the random-access preamble 113 on physical random access resources corresponding to the SSB beam with the best received RSRP value where the gNB 12 will be configured with a beam 121 in the direction of the UE 10.

Further, as shown in the communications of Phase #1 as shown in FIG. 1 there is receiving by the UE 10 from the gNB 12 a Msg2 115 with a MAC RAR, sending by the UE 10 towards the gNB 12 a Msg 3 117 with an RRC Request, and receiving by the UE 10 from the gNB 12 a Msg 4 119 with an indication of RRC setup.

Phase #2: in Phase #2 120 as shown in FIG. 1 the UE is configured for static broad Rx beam 122 while gNB is performing refined DL CSI-RS beam Tx sweeping 124. Here the UE receives n×CSI-RS beams 123, where n as used herein is an integer. UE measures RSRP (or other metric, e.g. SINR) for all CSI-RS beams received and reports best beam ID back to gNB using same beam configuration as in RX.

These Phase #2 120 operations as shown in FIG. 1 can be based on 8 Tx sweeps 123 by the gNB 12 and are shown in item 124 of FIG. 1, and the UE operations at this PHASE #2 are based on static pattern 122 as shown in FIG. 1.

Phase #3: in Phase #3 130 as shown in FIG. 1 the gNB 12 transmits m×CSI-RS beams 131, where m as used herein is an integer, with best beam 134 found in Phase #2. The UE 10 is refining its RX beam settings through m RX sweeps 132 as shown in FIG. 1 for identification of the best narrow RX beam.

At the end of P3, alignment between gNB TX beam 145 and UE RX beam 140 is obtained as shown in FIG. 1 as Msg (data) 144 for maximized directional gain and minimum interference to other users in serving and neighbor cells.

The beam alignment procedure as depicted in FIG. 1 is aligning the gNB TX beam with the UE RX beam. For this to also be adequate for UL transmissions, UL/DL beam correspondence is assumed on both gNB and on UE side, i.e. the optimum UL beam setting can be derived from the DL beam setting. The definition of UL/DL beam correspondence is depicted in FIG. 2.

Figure 2:
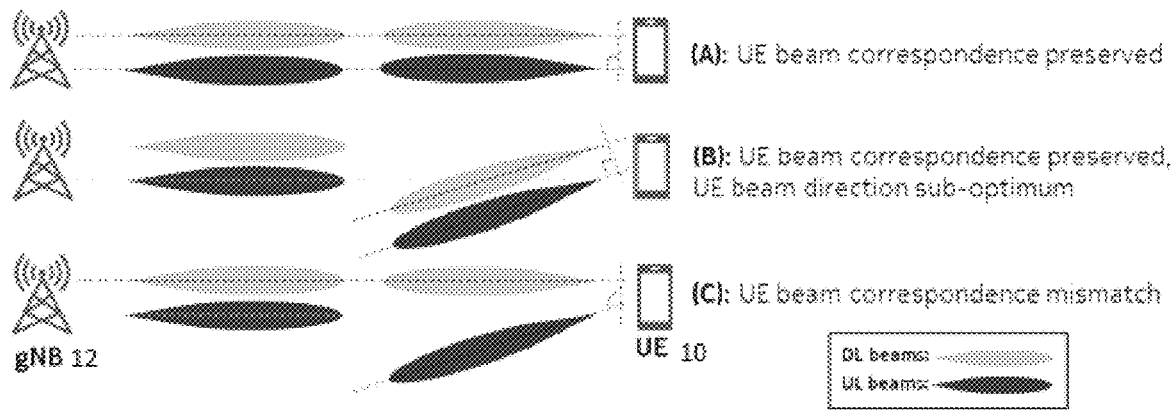
FIG. 2 shows UE UL/DL beam correspondence definition.

The case of beam alignment between gNB and UE in both UL and DL direction with UL/DL beam correspondence preserved is shown in FIG. 2 at step (A). Step (B) of FIG. 2 shows case with UL/DL beam correspondence preserved but with suboptimum UE DL beam direction. The case of optimum UE DL beam alignment but UE UL/DL beam correspondence broken is shown in step (C) of FIG. 2.

UL/DL beam correspondence is preserved if:
1. Using identical antenna element weights for DL & UL result in identical beam gain and direction for DL & UL; and/or
2. Antenna element weights can be offset by pre-characterized values to obtain identical beam gain and direction for DL & UL If 1) and/or 2) above is not fulfilled, then beam correspondence is broken and the UL will be misaligned as depicted in step (C) of FIG. 2.

While careful design and characterization aims at securing UL/DL beam correspondence there are more factors which may impact UE UL/DL beam correspondence dynamically in the field. The problem cases may arise when the antenna load is changing between DL and UL to the extent that it starts to significantly impact the beam direction for fixed antenna array weights. As such the problem is increasing with frequency as beams are getting narrower with associated increased demand for high beam direction accuracy for sustained link budget.

Some loading effects which may impact UL/DL beam correspondence dynamically in the field and which may not all be compensated by characterization are listed below:
External load mismatch;
Load variation vs TX power level;
Load variation vs bandwidth;
Load variation vs temperature; and
Load variation vs battery voltage A prerequisite for enablement of beam correspondence failure mitigating actions at system level or local at the UE is to be able to detect a case of beam correspondence (step (A) and step (B) of FIG. 2) from a case of lost UL/DL beam correspondence (step (C) of FIG. 2). The detection of UE UL/DL beam correspondence mismatch is one topic of an example embodiment of the invention.

Beam reciprocity has so far been assumed in 3GPP, which means standardized mechanisms to verify and potentially correct the DL/UL beam misalignment between gNB and UE have not been discussed in 3GPP.

Companies have however already raised concerns about risk of imperfect UL/DL beam reciprocity in practical implementations, see e.g. R4-1900895 and RP-182495.

It is noted that there has been proposed a method for verification of the DL beam alignment, e.g., alignment between the gNB Tx and UE Rx beams. However, even if DL beams are aligned, communication in the UL direction of transmission could still suffer from an UL beam alignment problem (i.e. misalignment between UE Tx and gNB Rx beams, as depicted in step (C) of FIG. 2) and detection of such misalignment is another topic of an example embodiment of the invention.

In accordance with example embodiments of the invention there is a procedure for detection of UE UL/DL beam correspondence misalignment.

The basic idea behind the proposed novel UL/DL beam correspondence misalignment detection procedure is to measure RSRP for both the selected directional beam and for spatially tilted beams using the associated delta power/s measured in DL and UL as comparison metric.

Figure 8:
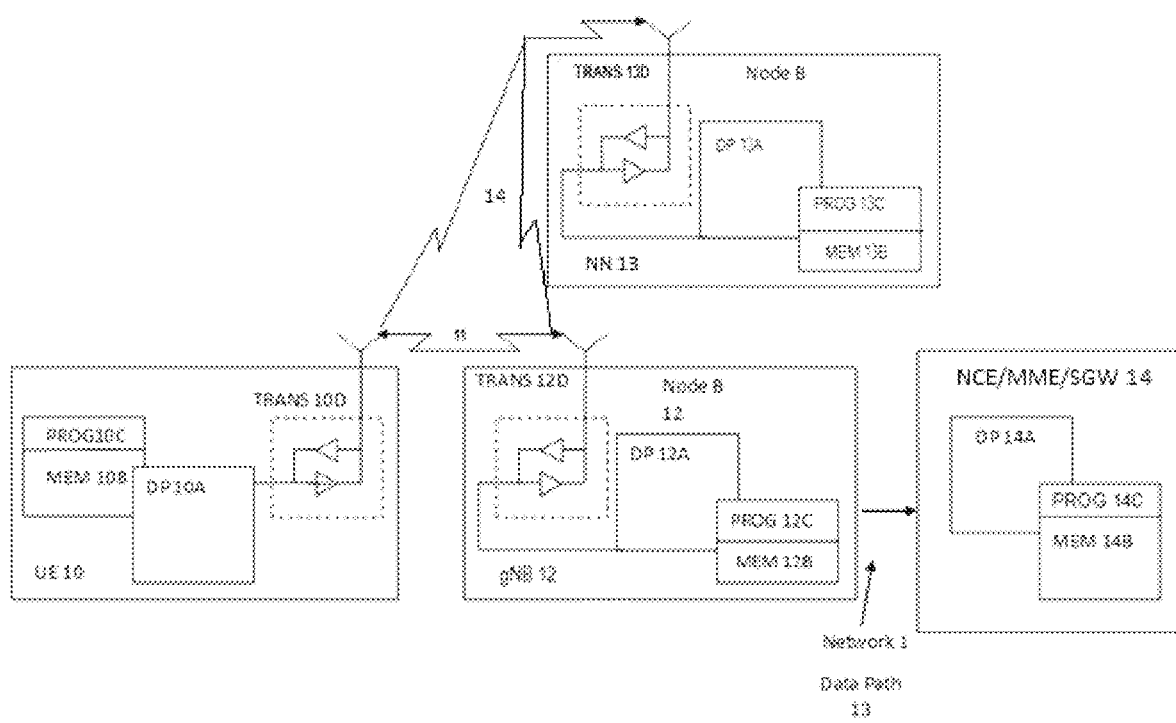
FIG. 8 shows a high level block diagram of various devices used in carrying out various aspects of the invention.

Before describing the example embodiments of the invention in detail, reference is made to FIG. 8 for illustrating a simplified block diagram of various electronic devices that are suitable for use in practicing the example embodiments of this invention.

At a top level the procedure includes at least following some main steps with additional details and at least FIGS. 3, 4, 5, 6, and 7 as presented herein:
1. Pre-verification: As an initial step prior to UL/DL correspondence verification a DL beam alignment verification may be conducted. A procedure for DL beam alignment verification has been proposed;
2. gNB: Initiation of measurement. At any given time a request for UL/DL beam misalignment measurement may be transmitted by the gNB to the UE. This may be triggered upon the gNB experiencing poor UL quality despite the confirmed DL beam alignment, or triggered at the UE and then requested by the UE;
3. gNB→UE: gNB requests UE to measure RSRP for selected and spatial angle tilted DL beams:
   The gNB shall use the same transmission power (spectral density) and the same DL Tx beam configuration when transmitting RS in downlink a while the UE is receiving using different beam configurations;
4. UE: The UE measures the DL RSRP using its selected DL beam (B1), DL_RSRP_B1 and using the tilted DL beam (B2), DL_RSRP_B2;
5. UE: The UE transmits reference signal in the UL using the selected beam B1 and the tilted beam B2:
   The UE shall use the same transmission power (spectral density) when transmitting RS in uplink using different beam configurations;
6. gNB: gNB measures the RSRP in correspondence of the reference signals transmitted by the UE using a same UL Rx beam configuration, UL_RSRP_B1 and UL beam B2, UL_RSRP_B2;
7. UE→gNB: The UE reports back to serving gNB the measured RSRP for beams B1, DL_RSRP_B1 and B2 DL_RSRP_B2;
8. gNB: gNB calculates the DL and UL delta gain as:
   dg_DL=DL_RSRP_B1−DL_RSRP_B2
   dg_UL=UL_RSRP_B1−UL_RSRP_B2;
9. gNB: gNB compares the UL and DL delta gains against a predefined Threshold, threshold:
   if |dg_DL−dg_UL|<=threshold→UE beam correspondence is preserved if |dg_DL−dg_UL−>threshold→UE beam correspondence is broken;

10. gNB→UE: gNB delivers beam correspondence verdict report to UE for any UE local mitigation actions; and 11. gNB & UE: In case of broken beam correspondence corrective actions are initiated between gNB and UE.

The two measurements in 4 and the two measurements in 6 need to be performed within the channel coherence time to ensure the delta measured is due to the tilting of the beam and not due to environmental changes, which can affect the path loss.

It is noted that the underlined text above is identifying some main inventive signalling steps which will need to be anchored into the NR specifications.

FIG. 8 shows a block diagram of one possible and non-limiting exemplary system in which the example embodiments of the invention may be practiced. In FIG. 8, a user equipment (UE) 10 is in wireless communication with a wireless network 1. A UE is a wireless, typically mobile device that can access a wireless network. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to gNB 12 and NN 13, respectively. The one or more memories MEM 10B include computer program code PROG 10C. The UE 10 communicates with gNB 12 and/or NN 13 via a wireless link 111.

The gNB 12 (NR/5G Node B or possibly an evolved NB) is a base station such as a master or secondary node base station (e.g., for NR or LTE long term evolution) that communicates with devices such as NN 13 and UE 10 of FIG. 8. The gNB 12 provides access to wireless devices such as the UE 10 to the wireless network 1. The gNB 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the gNB 12 to perform one or more of the operations as described herein. The gNB 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/MME/SGW device such as the NCE/MME/SGW 14 of FIG. 8.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the gNB 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the gNB 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/MME/SGW device such as the NCE/MME/SGW 14 of FIG. 8. The NCE/MME/SGW 14 including MME (Mobility Management Entity)/SGW (Serving Gateway) functionality, such as User Plane Functionalities, and/or an Access Management functionality for LTE and similar functionality for 5G.

The one or more buses of the device of FIG. 8 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the gNB 12 being physically in a different location from the RRH, and the one or more buses 157 could be implemented in part as fiber optic cable to connect the other elements of the gNB 12 to a RRH.

It is noted that although FIG. 8 shows a network node or base station such as the gNB 12 as in FIG. 8 and mobility management device such as the NN 13 as in FIG. 8, these devices can incorporate or be incorporated into an eNodeB or eNB or gNB such as for LTE and NR, and would still be configurable to perform example embodiments of the invention as described in this application.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE/MME/SGW) 14 that may include NCE (Network Control Element), MME (Mobility Management Entity)/SGW (Serving Gateway) functionality, and which provides connectivity with a further network, such as a telephone network and/or a data communications network (e.g., the Internet). The gNB 12 and the NN 13 are coupled via a link 13 and/or link 14 to the NCE/MME/SGW 14. In addition, it is noted that the operations in accordance with example embodiments of the invention, as performed by the NN 13, may also be performed at the NCE/MME/SGW 14.

The NCE/MME/SGW 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE/MME/SGW 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, gNB 12, NN 13, and other functions as described herein.

Below are described in more detail further implementations in accordance with example embodiments of the invention.

Figure 3:
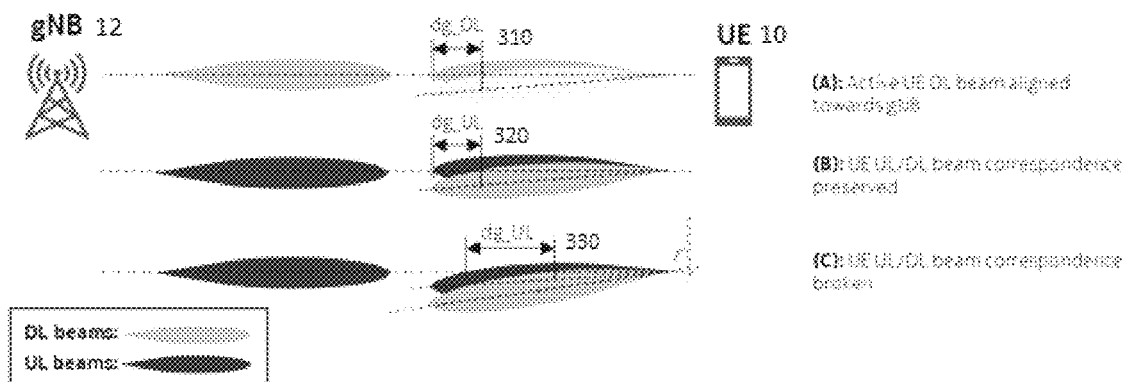
FIG. 3 shows a basic principle of an UL/DL beam misalignment detection approach in accordance with an example embodiment of the invention.

FIG. 3 shows a basic principle of an UL/DL misalignment approach between a UE, such as between the UE 10 and the gNB 12 as in FIG. 8, in accordance with and example embodiment of the invention. FIG. 3 depicts an example of the idea with the selected UE DL beam tilted in one direction only. By appropriately choosing the tilt angle (identical tilt angle in UL and DL) relative to the used beam-width, the delta gain between the active DL beam and the tilted DL beam in the direction of the gNB will be measurable at the UE, shown as dg_DL in FIG. 3 at step (A). For the case of UL/DL beam correspondence preserved, the gNB will in the UL direction measure the similar delta gain, as the UE measures in DL, between the active UL beam and the tilted UL beam, dg_UL (FIG. 3 (B)). For the case of broken UL/DL beam correspondence both the selected and the tilted UL beams are not pointing towards the gNB and thus the delta gain in the UL direction is likely to be different from the delta gain in the DL direction.

The delta gains in DL (dg_DL) and UL (dg_UL) direction are given by:

$$dg\_DL = DL\_RSRP\_B1 - DL\_RSRP\_B2$$

$$dg\_UL = UL\_RSRP\_B1 - UL\_RSRP\_B2$$

Where B1 is the selected beam and B2 is the tilted beam. UL/DL beam correspondence misalignment can thus be detected by comparing delta gains against a specified threshold:

$$|dg\_DL - dg\_UL| \leq \text{threshold} \rightarrow UE\ UL/DL \text{ beam correspondence is preserved; or}$$

$$|dg\_DL - dg\_UL| > \text{threshold} \rightarrow UE\ UL/DL \text{ beam correspondence is broken}$$

Figure 7:
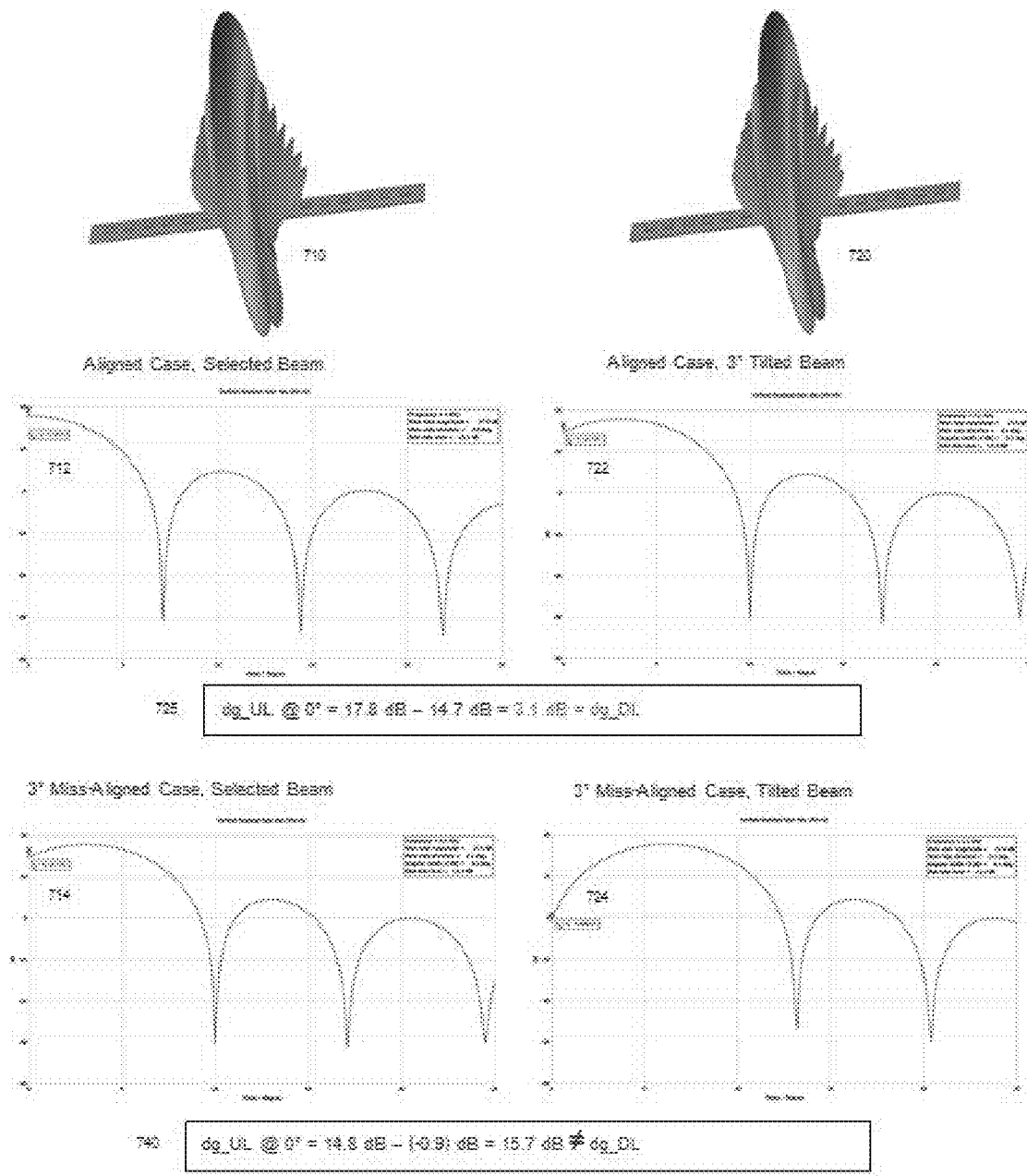
FIG. 7 shows a simulation example for UE antenna radiation pattern with appropriate tilt angle selection.

The procedure requires selection of tilt angle fitting the selected beam pattern for maximizing detection sensitivity. I.e. if measured dg_DL is approaching 0 dB the tilt angle may be too low and if dg_DL is too high there is risk that the gNB may not be able to detect the reference symbol and measure RSRP for the tilted UL beam. Multiple different tilt beams could be selected to increase the selection sensitivity. If the tilt angle is not available from UE characterisation an iterative search may be implemented as part of the procedure to obtain a tilt angle giving a DL delta power readout, dg_DL within a target window. FIG. 7 shows an example of a 3D UE antenna radiation pattern with appropriate tilt angle selection for the proposed detection approach.

The reference signal used may be an already available type or a new RS design. The main requirement is that channel coherency is maintained over the duration of the active and tilted beam measurements. Dependent on the deployment scenario being semi static or highly dynamic coherency may be fulfilled over successive occurrences of the same RS configuration or the delta beam measurements need to be performed on the same occurrence of the RS.

Figure 4:
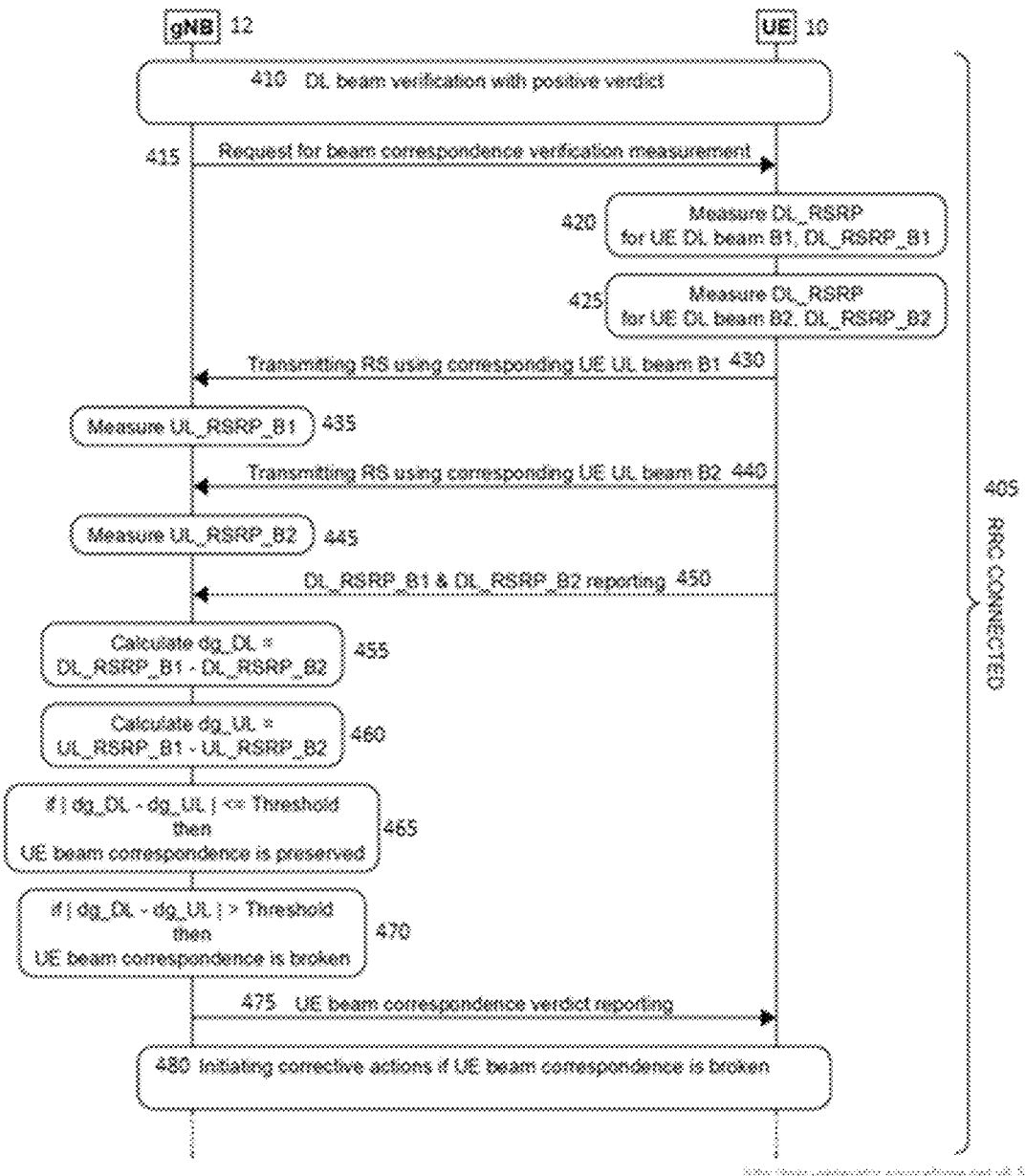
FIG. 4 shows signalling flow for the proposed UL/DL beam correspondence mismatch detection procedure in accordance with an example embodiment of the invention.

FIG. 4 shows a signalling flow for a proposed UL/DL beam correspondence mismatch detection procedure in accordance with an example embodiment of the invention.

With reference to the signalling flow diagram in FIG. 4 the measurement procedure is described below:

1. As shown in step 410 of FIG. 4 a DL beam alignment is confirmed. It is noted that this step is an optional step in accordance with example embodiments of the invention as disclosed herein;
2. gNB→UE: As shown in step 415 of FIG. 4, at any given time (selected by serving gNB) an UL/DL beam misalignment measurement is requested by gNB:
    This may be triggered upon gNB experiencing poor UL quality despite the confirmed DL beam alignment.
    In an alternative embodiment the UE may trigger step 415 based on internal link quality indicators.
    The UL and DL RS configurations could be signaled to the UE as part of the request message, or pre-configured using higher layer signaling (e.g. RRC) and activated by the gNB request message;
3. UE: As shown in steps 420 and 425 of FIG. 4 the UE measures the DL RSRP using its selected DL beam (B1), DL_RSRP_B1;
4. UE: The UE tilts the beam (B2) and measures the DL RSRP, DL_RSRP_B2:
    The tilt angle depends on the characteristics of the UE selected beam and is derived by UE characterization,
    In another embodiment the tilt angle is obtained by iterative measurements, which may require some further communication with serving gNB to ensure channel coherency is preserved and reference signal transmission remains active, Note that the gNB shall use the same transmission power (spectral density) and the same DL Tx beam configuration when transmitting RS in downlink while the UE is using different RX beam configurations so that the difference between DL_RSRP_B1 and DL_RSRP_B2 is not affected by differences in the gNB transmission power;

5. UE: As shown with step 430 of FIG. 4 the UE transmits reference signal in the UL using the selected beam B1;
6. gNB: As shown with step 435 of FIG. 4 gNB measures the RSRP in correspondence of the RS transmitted by the UE using beam B1;
7. UE: As shown with step 440 of FIG. 4 The UE transmits reference signal in the UL using the tilted beam B2 and same transmission power (spectral density) as used when transmitting reference signal in the UL using the selected beam B1 (step 5);
8. gNB: As shown with steps 435 of FIG. 4 gNB measures the RSRP in correspondence of the RS transmitted by the UE using beam B2;
9. UE→gNB: The UE reports back to serving gNB the measured DL_RSRP for beams B1 and B2.

Alternatively, the UE only reports dg_DL to gNB to reduce overhead;
10. gNB: As shown with step 455 of FIG. 4 gNB calculates the DL delta gain as:
    dg_DL=DL_RSRP_B1−DL_RSRP_B2;
11. gNB: As shown with step 460 of FIG. 4 gNB calculates the UL delta gain as:
    dg_UL=UL_RSRP_B1−UL_RSRP_B2;
12. gNB: gNB compares the UL and DL delta gains against a predefined Threshold (step 465 and 470), threshold:

if |dg_DL−dg_UL|<=threshold→UE beam correspondence is preserved if |dg_DL−dg_UL|>threshold→UE beam correspondence is broken The threshold value also depends on the characteristics of the UE selected beam and may be derived by UE characterization along with the tilt angle;
13. gNB→UE: As shown with step 475 of FIG. 4 gNB delivers beam correspondence verdict report to UE for any UE local mitigation actions;

The verdict report could be the verdict alone or include a verdict and the |dg_DL−dg_UL| value.
14. gNB & UE: As shown with step 480 of FIG. 4 in case of broken beam correspondence corrective actions are initiated between gNB and UE.

Figure 5:
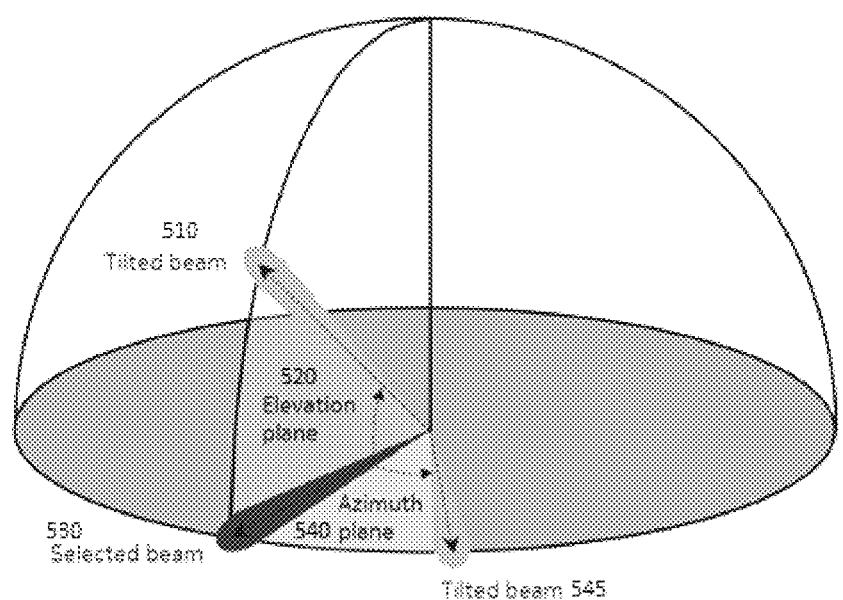
FIG. 5 shows UL and DL UE beam tilting in the azimuth and elevation plane.

The procedure may be further refined by using two tilted beams as sketched in FIG. 5, one tilted beam 510 at an angle in the azimuth plane 540 and one tilted at an angle in the elevation plane 520 with reference to the selected beam 530 direction. This will increase the likelihood of misalignment detection but equally important it may also provide valuable information on the spatial direction for UL beam alignment recovery, when the |dg_DL−dg_UL| values are reported back to the UE.

Figure 6:
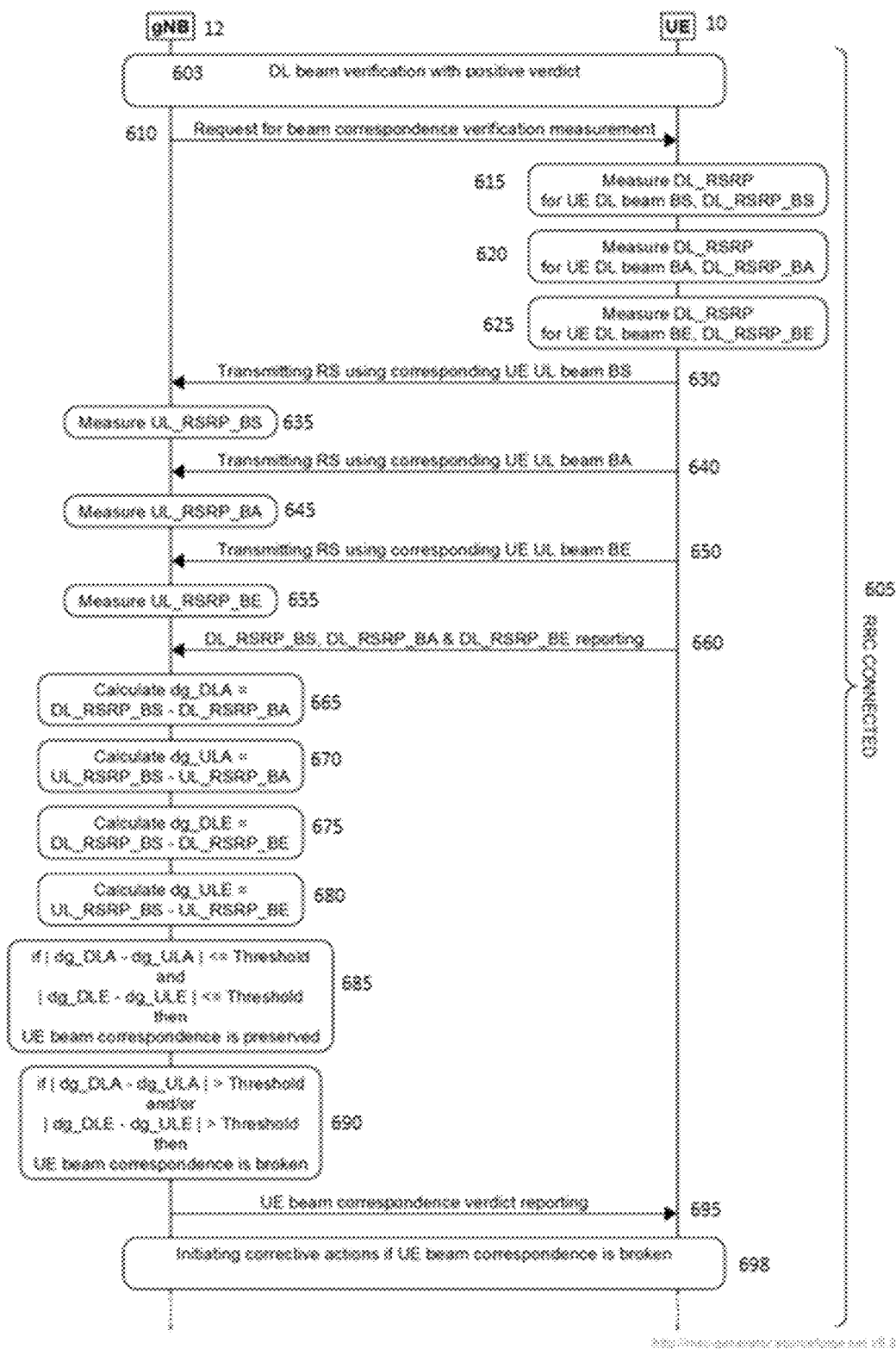
FIG. 6 shows a signaling flow for the UL/DL beam correspondence mismatch detection procedure with tilted beam measurement in the azimuth and elevation planes in accordance with an example embodiment of the invention.

With reference to the signalling flow diagram in FIG. 6 the measurement procedure is described below:

1. As shown in step 603 of FIG. 6 a DL beam alignment is confirmed. It is again noted that this step is an optional step in accordance with example embodiments of the invention as disclosed herein;
2. gNB→UE: As shown in step 610 of FIG. 6, at any given time (selected by serving gNB) an UL/DL beam misalignment measurement is requested by gNB:

This may be triggered upon gNB experiencing poor UL quality despite the confirmed DL beam alignment In an alternative embodiment the UE may trigger steps of the invention, such as steps beginning at step 615 of FIG. 6 based on internal link quality indicators;
3. UE: As shown in step 615 of FIG. 6 the UE measures the DL RSRP using its selected DL beam (BS), DL_RSRP_BS;
4. UE: As shown in step 620 of FIG. 6 the UE tilts the beam in the azimuth direction (BA) at a UE defined angle and measures the DL RSRP, DL_RSRP_BA;
5. UE: As shown in step 625 of FIG. 6 the UE tilts the beam in the elevation direction (BE) at a UE defined angle and measures the DL RSRP, DL_RSRP_BE;
6. UE: As shown in step 630 of FIG. 6 the UE transmit reference signal in the UL using the selected beam BS;
7. gNB: As shown in step 635 of FIG. 6 the gNB measures the RSRP in correspondence of the RS transmitted by the UE using beam BS, UL_RSRP_BS;
8. UE: As shown in step 640 of FIG. 6 the UE transmit reference signal in the UL using the azimuth tilted beam BA;
9. gNB: As shown in step 645 of FIG. 6 the gNB measures the RSRP in correspondence of the RS transmitted by the UE using beam BA, UL_RSRP_BA;
10. UE: As shown in step 650 of FIG. 6 the UE transmit reference signal in the UL using the elevation tilted beam BE;
11. gNB: As shown in step 655 of FIG. 6 the gNB measures the RSRP in correspondence of the RS transmitted by the UE using beam BE, UL_RSRP_BE;
12. UE→gNB: As shown in step 660 of FIG. 6 the UE reports back to serving gNB the measured DL_RSRP for beams BS, BA and BE.

Alternatively, the UE only reports dg_DLA & dg_DLE to gNB to reduce overhead
13. gNB: As shown in steps 665, 670, 675, and 680 of FIG. 6 the gNB calculates the DL delta gains as:
    dg_DLA=DL_RSRP_BS−DL_RSRP_BA,
    dg_DLE=DL_RSRP_BS−DL_RSRP_BE;
14. gNB: As shown in steps 685 and 690 of FIG. 6 gNB calculates the UL delta gains as:
    dg_ULA_=UL_RSRP_BS−UL_RSRP_BA,
    dg_ULE_=UL_RSRP_BS−UL_RSRP_BE;
15. gNB: As shown in step 685 and 690 of FIG. 6 gNB compares the UL and DL delta gains against a predefined Threshold, threshold:

if |dg_DLA−dg_ULA|<=threshold and |dg_DLE−dg_ULE|<=threshold→UE beam correspondence is preserved, if |dg_DLA−dg_ULA|>threshold and/or |dg_DLE−dg_ULE|>threshold→UE beam correspondence is broken, In another embodiment the threshold used may be specific for the azimuth and the elevation plane evaluation, The threshold value (or values) also depends (or depend) on the characteristics of the UE selected beam and may be derived by UE characterization jointly with the tilt angle;
16. gNB→UE: As shown in step 695 of FIG. 6 gNB delivers beam correspondence verdict report to UE for any UE local mitigation actions;

The verdict report could be the verdict alone or verdict and the |dg_DLA−dg_ULA| and |dg_DLE−dg_ULE| values.

17. gNB & UE: As shown in step 698 of FIG. 6, in case of broken beam correspondence corrective actions are initiated between gNB and UE:
In this context the obtained delta gains in the azimuth and elevation planes may be used to indicate direction of UL beam alignment recovery.

Example UE Antenna Radiation Pattern with Appropriate Tilt Angle Selection

As mentioned above the procedure requires selection of delta tilt angle fitting the selected beam pattern and the expected dynamic loading impact on the UL beam direction for maximizing the detection sensitivity.

FIG. 7 shows an example of a 3D UE antenna radiation pattern with appropriate tilt angle selection for one proposed detection approach in accordance with example embodiments of the invention. A simulated example for a UE 1×16 antenna array boresight aligned to gNB is shown in FIG. 7 (710). As seen, this UE antenna has a very narrow high gain main beam towards the gNB with a gain of ~18 dB with an angular width of only ~6 deg.

Choosing a tilt angle of 3 degrees as shown in 720 of FIG. 7 the expected dg_DL is approximately 3 dB when the beam correspondence is preserved. As shown in FIG. 7 there is 2D radiation patterns for a selected beam 712 and a 3° tilted beam 722, which represents the aligned case and dg_UL is calculated to 3.1 dB using equation 725 as shown in FIG. 7, which indicates UL/DL beam alignment since dg_DL≈dg_UL. A UL/DL beam mis-alignment case of 3° is shown for the selected beam 714 and the tilted beam 724 and dg_UL is calculated to 15.7 dB using equation 740, which is far from dg_DL of approximately 3 dB and a clear indication of UL/DL beam mis-alignment.

Selecting the right tilt for the tilted beam is important and a good initial approach is to use a tilt angle of half the value of the fist null in the radiation pattern (null°/2).

Reference Signal Configurations

As specified by 3GPP the downlink RSRP measurement can be done by configuring the UE with a Report Setting indicating that L1-RSRP is to be reported and a Resource Setting indicating the particular CSI-RS or SSB/PBCH block that is to be measured.

If an SSB/PBCH block is to be used as the DL reference signal, the Resource Setting would indicate the particular SSB/PBCH block that would be best for the UE. However, if a CSI-RS is to be used, the base can transmit a "CSI-RS resource for beam management," which has been called a "CSI-RS resource in a NZP-CSI-RS-ResourceSet configured with higher layer parameter repetition". The gNB has two options for which TX beam to use to transmit the CSI-RS: a beam that was used to transmit an SSB/PBCH block (e.g., a wide beam) or a refined beam (e.g., a narrow beam). If the gNB transmits the CSI-RS with a beam that was used to transmit an SSB, the CSI-RS would have a TCI state where DL RS1 is the particular SSB (with QCL TypeC) and DL RS2 is the same SSB (with QCL TypeD). (The DL-RSx in the TCI state indicates to the UE that the UE should use the same RX beam that was used to receive the RS indicated in the DL-RSx field of the TCI configuration). If the gNB transmits with a refined beam, the CSI-RS would have a TCI state where DL RS1 is the TRS (with QCL-TypeA) and DL RS2 is the particular CSI-RS for beam management (QCL-TypeD), where the TRS and CSI-RS for beam management are both transmitted out of the refined beam.

The UL RSRP measurement can be done by configuring the UE to transmit SRS, most likely aperiodic SRS, where the SRS is configured via RRC and the DCI triggers the SRS resource set to be used. To ensure that the SRS is transmitted with the proper UE TX beam, the SRS would be configured with the parameter spatialRelationInfo containing the ID of the reference DL RS, which would be either the SS/PBCH or CSI-RS used for the DL RSRP measurement.

Advantages of using example embodiments of the invention include that at the end of the 3GPP NR Rel15 beam alignment procedure an alignment is obtained between gNB TX beam and UE RX beam. Associated alignment between UE TX beam and gNB RX beam is indirectly assumed by UL/DL beam correspondence. UL/DL beam correspondence may be broken under certain scenarios in the field which will impact link performance and cause increased cell interference if left undetected. The procedures in accordance with example embodiments of the invention enables detection of such cases of broken UE UL/DL beam correspondence which may be a first step enabling initiation of corrective actions local to the UE or at system level.

Figure 9A:
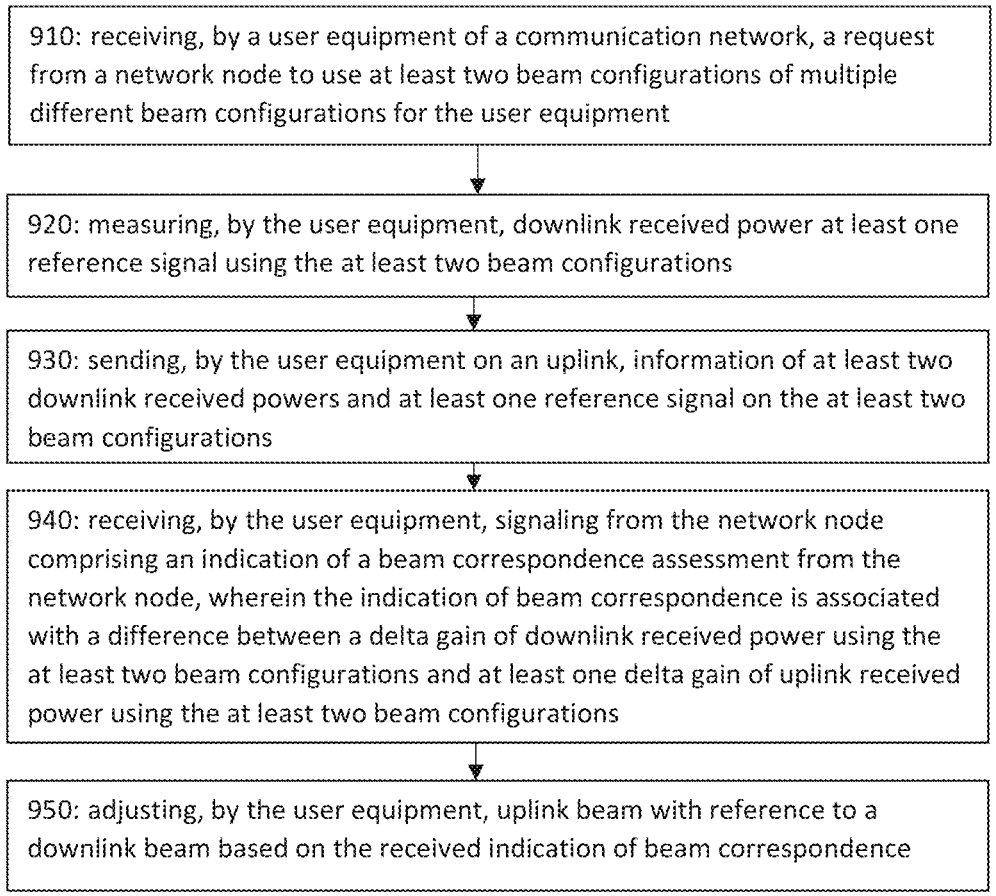
FIG. 9A and FIG. 9B each show a method in accordance with example embodiments of the invention which may be performed by an apparatus.
Figure 9B:
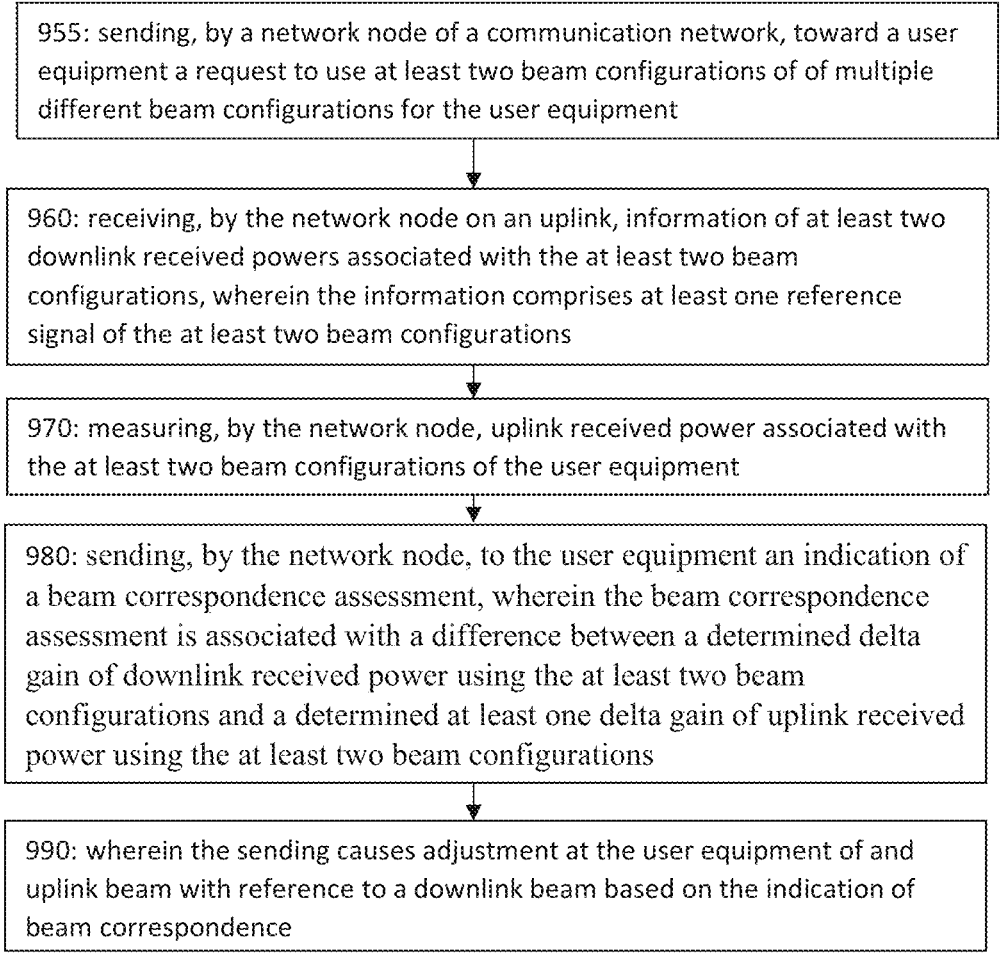

FIG. 9A and FIG. 9B each show a method in accordance with example embodiments of the invention which may be performed by an apparatus.

FIG. 9A illustrates operations which may be performed by a device such as, but not limited to, a device (e.g., the UE 10 as in FIG. 8). As shown in step 910 of FIG. 9A there is receiving, by a user equipment of a communication network, a request from a network node to use at least two beam configurations of multiple different beam configurations for the user equipment. As shown in step 920 of FIG. 9A there is measuring, by the user equipment, downlink received power on at least one reference signal using the at least two beam configurations. As shown in step 930 of FIG. 9A there is sending, by the user equipment on an uplink, information of at least two downlink received powers and at least one reference signal on the at least two beam configurations. As shown in step 940 of FIG. 9A there is receiving, by the user equipment, signaling from the network node comprising an indication of a beam correspondence assessment from the network node, wherein the indication of beam correspondence is associated with a difference between at least one delta gain of downlink received power using the at least two beam configurations and at least one delta gain of uplink received power using the at least two beam configurations. Then as shown in step 950 of FIG. 9A wherein the indication of beam correspondence is associated with a difference between a delta gain of downlink received power using the at least two beam configurations and at least one delta gain of uplink received power using the at least two beam configurations. Then as shown in step 950 of FIG. 9A there is adjusting, by the user equipment, uplink beam with reference to a downlink beam based on the received indication of beam correspondence.

In accordance with the example embodiments as described in the paragraph above, wherein configurations of the at least one reference signal are one of preconfigured at the user equipment or received from the communication network.

In accordance with the example embodiments as described in the paragraphs above, wherein sending the information of the downlink received power comprises sending toward the network node at least one of received power delta between the at least two beam configurations.

In accordance with the example embodiments as described in the paragraphs above, wherein the signaling from the network node comprises at least one of an uplink or downlink delta gain associated with the beam correspondence assessment.

In accordance with the example embodiments as described in the paragraphs above, wherein the tilt angle beam is based on at least one of characteristics of the user equipment, or iterative measurements coordinated by the user equipment with the communication network.

In accordance with the example embodiments as described in the paragraphs above, wherein the indication of beam correspondence assessment is associated with a comparison to a threshold of the difference between at least one delta gain of downlink received power and at least on delta gain of uplink received power using the at least two beams.

In accordance with the example embodiments as described in the paragraphs above, wherein the indication of beam correspondence assessment is associated with a difference between at least one delta gain of downlink received power using the at least two beam configurations and at least one delta gain of uplink received power using the at least two beam configurations.

In accordance with the example embodiments as described in the paragraphs above, wherein the threshold value is one of: predefined by the communication network, specific to an azimuth and elevation plane evaluation, depending on characteristics of at least one beam of the multiple different beam configurations for the user equipment, or derived by characterization of the user equipment and the tilted angle beam.

In accordance with the example embodiments as described in the paragraphs above, wherein the indication of beam correspondence assessment is identifying a misalignment of at least one beam of multiple different beam configurations of the user equipment based on the difference between at least one delta gain of downlink received power and at least one delta gain of uplink received power using the at least two beam configurations being above the threshold.

In accordance with the example embodiments as described in the paragraphs above, where the indication of beam correspondence comprises a beam correspondence verdict report for adjusting the uplink beam with reference to the downlink beam based on the received indication of beam correspondence assessment to correct the identified misalignment.

In accordance with the example embodiments as described in the paragraphs above, where the indication of beam correspondence comprises a beam correspondence verdict report for the adjustment of the uplink beam with reference to the downlink beam based on the received indication of beam correspondence to correct the identified misalignment.

A non-transitory computer-readable medium (MEM 10B of FIG. 8) storing program code (e.g., PROG 10C of FIG. 8), the program code embodied on a memory (e.g., MEM 10B of FIG. 8) executed by at least one processor (e.g., DP 10A of FIG. 8) to perform the operations as at least described in the paragraphs above.

In accordance with an example embodiment of the invention as described above there is an apparatus comprising: means for receiving (e.g., TRANS 10D, MEM 10B, PROG 10C, and DP 10A as in FIG. 8), by a user equipment (e.g., UE 10 as in FIG. 8) of a communication network (e.g., Network 1 as in FIG. 8), a request from a network node (e.g., NN 13 as in FIG. 8) to use at least two beam configurations of multiple different beam configurations for the user equipment; means for measuring (e.g., TRANS 10D, MEM 10B, PROG 10C, and DP 10A as in FIG. 8), by the user equipment, downlink received power using the at least two beam configurations; means for sending (e.g., e.g., TRANS 10D, MEM 10B, PROG 10C, and DP 10A as in FIG. 8), by the user equipment on an uplink, information of the downlink received power and at least one reference signal of the at least two beam configurations; means for receiving (e.g., e.g., TRANS 10D, MEM 10B, PROG 10C, and DP 10A as in FIG. 8), by the user equipment, indication of beam correspondence from the network node, wherein the indication of beam correspondence is associated with a difference between a delta gain of downlink received power using the at least two beam configurations and at least one delta gain of uplink received power using the at least two beam configurations; and means for adjusting (e.g., e.g., TRANS 10D, MEM 10B, PROG 10C, and DP 10A as in FIG. 8), by the user equipment, uplink beam with reference to downlink beam based on the received indication of beam correspondence.

In the example aspect of the invention according to the paragraph above, wherein at least the means for receiving, measuring, sending, and adjusting comprises transceiver [e.g., TRANS 10D as in FIG. 8] a non-transitory computer readable medium [e.g., MEM 10B as in FIG. 8] encoded with a computer program [e.g., PROG 10C as in FIG. 8] executable by at least one processor [e.g., DP 10A as in FIG. 8].

FIG. 9B illustrates operations which may be performed by a device such as, but not limited to, a device (e.g., the NN 13 as in FIG. 8). As shown in step 955 of FIG. 9B there is sending, by a network node of a communication network, toward a user equipment a request for measurement of at least two beam configurations of multiple different beam configurations of the user equipment. As shown in step 960 of FIG. 9B there is receiving, by the network node on an uplink, information of at least two downlink received powers associated with the at least two beam configurations, wherein the information comprises at least one reference signal of the at least two beam configurations. As shown in step 970 of FIG. 9B there is measuring, by the network node, uplink received power associated with the at least two beam configurations of the user equipment. As shown in step 980 of FIG. 9B there is sending, by the network node, to the user equipment an indication of a beam correspondence assessment, wherein the beam correspondence assessment is associated with a difference between at least one determined delta gain of downlink received power using the at least two beam configurations and a determined at least one delta gain of uplink received power using the at least two beam configurations. Then as shown in step 990 of FIG. 9B wherein the sending causes adjustment at the user equipment of and uplink beam with reference to a downlink beam based on the indication of beam correspondence.

In accordance with the example embodiments as described in the paragraph above, wherein the sending the request is triggered by a determination by one of the network node or the user equipment based on a quality degradation of at least one beam of the multiple different beam configurations or a request received from the UE and triggered at the UE by internal measurement values.

In accordance with the example embodiments as described in the paragraphs above, wherein configurations of the at least one reference signal are provided by the communication network to the user equipment.

In accordance with the example embodiments as described in the paragraphs above, wherein information comprising the at least one reference signal of the at least two beam configurations comprise a first reference signal using a selected beam of the multiple different beam configurations and a second at least one reference signal using a tilted angle beam of the multiple different beam configurations.

In accordance with the example embodiments as described in the paragraphs above, wherein the tilt angle beam is based on at least one of characteristics of the user equipment, or iterative measurements coordinated by the user equipment with the communication network.

In accordance with the example embodiments as described in the paragraphs above, wherein the indication of beam correspondence is determined by the network node based on measurements of the at least one reference signal received power of the selected beam and the tilted angle beam.

In accordance with the example embodiments as described in the paragraphs above, wherein the indication of beam correspondence is associated with a comparison to a threshold of the difference between at least one determined delta gain of downlink received power and a determined at least one delta gain of uplink received power using the at least two beam configurations.

In accordance with the example embodiments as described in the paragraphs above, wherein the threshold value is one of: predefined by the communication network, specific to an azimuth and elevation plane evaluation, depending on characteristics of at least one beam of the multiple different beam configurations for the user equipment, or derived by characterization of the user equipment and the tilted angle beam.

In accordance with the example embodiments as described in the paragraphs above, wherein the indication of beam correspondence is identifying a misalignment of at least one beam of multiple different beam configurations of the user equipment based on the difference between the determined of at least one delta gain of downlink received power and the determined of at least one delta gain of uplink received power using the at least two beam configurations being above the threshold.

In accordance with the example embodiments as described in the paragraphs above, where the indication of beam correspondence comprises a beam correspondence verdict report for the adjustment of the uplink beam with reference to the downlink beam based on the received indication of beam correspondence to correct the identified misalignment.

In accordance with the example embodiments as described in the paragraphs above, wherein the determined of at least one delta gain of downlink received power is using an equation:

$$dg\_DL = DL\_RSRP\_B1 - DL\_RSRP\_B2$$

In accordance with the example embodiments as described in the paragraphs above, wherein the determined of at least one delta gain of uplink received power is using an equation:

$$dg\_UL = UL\_RSRP\_B1 - UL\_RSRP\_B2$$

A non-transitory computer-readable medium (MEM 13B of FIG. 8) storing program code (e.g., PROG 13C of FIG. 8), the program code embodied on a memory (e.g., MEM 13B of FIG. 8) executed by at least one processor (e.g., DP 13A of FIG. 8) to perform the operations as at least described in the paragraphs above.

In accordance with an example embodiment of the invention as described above there is an apparatus comprising: means for sending (e.g., TRANS 13D, MEM 13B, PROG 13C, and DP 13A as in FIG. 8), by a network node e.g., NN 13 as in FIG. 8) of a communication network (e.g., Network 1 as in FIG. 8), toward a user equipment a request to use at least two beam configurations; receiving, by the network node, from the user equipment information of downlink received power associated with at least two beam configurations of multiple different beam configurations for the user equipment; measuring (e.g., TRANS 13D, MEM 13B, PROG 13C, and DP 13A as in FIG. 8), by the network node, uplink received power associated with the at least two beam configurations of the user equipment; and sending (e.g., TRANS 13D, MEM 13B, PROG 13C, and DP 13A as in FIG. 8), by the network node, towards the user equipment an indication of a beam correspondence assessment determined by the network node and associated with a difference between a determined (e.g., TRANS 13D, MEM 13B, PROG 13C, and DP 13A as in FIG. 8) delta gain of downlink received power using the at least two beam configurations and a determined (e.g., TRANS 13D, MEM 13B, PROG 13C, and DP 13A as in FIG. 8) at least one delta gain of uplink received power using the at least two beam configurations, and wherein the sending causes adjustment at the user equipment of and uplink beam with reference to a downlink beam based on the indication of beam correspondence assessment.

In the example aspect of the invention according to the paragraph above, wherein at least the means for sending, receiving, and determining comprises transceiver [e.g., TRANS 13D as in FIG. 8] a non-transitory computer readable medium [e.g., MEM 13B as in FIG. 8] encoded with a computer program [e.g., PROG 13C as in FIG. 8] executable by at least one processor [e.g., DP 13A as in FIG. 8].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention.

However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed can include:

1. A method, comprising:
   receiving, by a user equipment of a communication network, a request from a network node to use at least two beam configurations of multiple different beam configurations for the user equipment;
   measuring, by the user equipment, downlink received power on at least one reference signal using the at least two beam configurations;
   sending, by the user equipment on an uplink, information of at least two downlink received powers and at least one reference signal using the at least two beam configurations;
   receiving, by the user equipment, signaling from the network node comprising an indication of beam correspondence assessment from the network node; and
   adjusting, by the user equipment, uplink beam with reference to a downlink beam based on the received indication of beam correspondence assessment.

2. The method of claim 1, wherein sending the information of the at least two downlink received powers comprises sending toward the network node at least one received power delta between the at least two beam configurations.

3. The method of claim 1, wherein the signaling from the network node comprises at least one of an uplink or downlink delta gain associated with the beam correspondence assessment.

4. The method of claim 1, wherein the indication of beam correspondence assessment is associated with a difference between at least one delta gain of downlink received power using the at least two beam configurations and at least one delta gain of uplink received power using the at least two beam configurations.

5. The method of claim 1, wherein the indication of beam correspondence assessment is associated with a comparison to a threshold of the difference between at least one delta gain of downlink received power and at least one delta gain of uplink received power using the at least two beams.

6. The method of claim 5, wherein the threshold value is associated with at least one of:
   predefined by the communication network,
   specific to an azimuth and elevation plane evaluation,
   depending on characteristics of at least one beam of the multiple different beam configurations for the user equipment, and
   derived by characterization of the user equipment and a tilted angle beam.

7. The method of claim 6, wherein the indication of beam correspondence assessment is identifying a misalignment of at least one beam of multiple different beam configurations of the user equipment based on the difference between at least one delta gain of downlink received power and at least one delta gain of uplink received power using the at least two beam configurations being above the threshold.

8. The method of claim 7, where the indication of beam correspondence comprises a beam correspondence verdict report for adjusting the uplink beam with reference to the downlink beam based on the received indication of beam correspondence assessment to correct the identified misalignment.

9. An apparatus comprising:
   at least one processor; and
   at least one memory including computer program code, where the at least one memory and the computer program code are configured, with the at least one processor, to cause the apparatus to at least:
   receive a request from a network node of a communication network to use at least two beam configurations of multiple different beam configurations for the apparatus;
   measure downlink received power using the at least two beam configurations;
   send, on an uplink, information of at least two downlink received powers and at least one reference signal using the at least two beam configurations;
   receive signaling from the network node comprising an indication of beam correspondence assessment from the network node; and
   adjust uplink beam with reference to a downlink beam based on the received indication of beam correspondence assessment.

10. The apparatus of claim 9, wherein sending the information of the at least two downlink received powers comprises sending toward the network node at least one received power delta between the at least two beam configurations.

11. The apparatus of claim 9, wherein the signaling from the network node comprises at least one of an uplink or downlink delta gain associated with the beam correspondence assessment.

12. The apparatus of claim 9, wherein the indication of beam correspondence assessment is associated with a difference between at least one delta gain of downlink received power using the at least two beam configurations and at least one delta gain of uplink received power using the at least two beam configurations.

13. The apparatus of claim 9, wherein the indication of beam correspondence assessment is associated with a comparison to a threshold of the difference between at least one delta gain of downlink received power and at least one delta gain of uplink received power using the at least two beams.

14. The apparatus of claim 13, wherein the threshold value is associated with at least one of:
   predefined by the communication network,
   specific to an azimuth and elevation plane evaluation,
   depending on characteristics of at least one beam of the multiple different beam configurations, and derived by characterization of the apparatus and a tilted angle beam.

15. The apparatus of claim 14, wherein the indication of beam correspondence assessment is identifying a misalignment of at least one beam of multiple different beam configurations based on the difference between at least one delta gain of downlink received power and at least one delta gain of uplink received power using the at least two beam configurations being above the threshold.

16. The apparatus of claim 15, where the indication of beam correspondence comprises a beam correspondence verdict report for adjusting the uplink beam with reference to the downlink beam based on the received indication of beam correspondence assessment to correct the identified misalignment.

17. An apparatus comprising:
at least one processor; and
at least one memory including computer program code, where the at least one memory and the computer program code are configured, with the at least one processor, to cause the apparatus to at least:
send toward a user equipment a request to use at least two beam configurations;
receive from the user equipment information of at least two downlink received powers associated with at least two beam configurations of multiple different beam configurations for the user equipment;
measure uplink received power associated with the at least two beam configurations of the user equipment; and
send towards the user equipment an indication of a beam correspondence assessment determined by the network node and associated with a difference between a determined at least one delta gain of downlink received power using the at least two beam configurations and a determined at least one delta gain of uplink received power using the at least two beam configurations.

18. The apparatus of claim 17, wherein the sending the request is triggered by a determination by the apparatus or the user equipment based on a quality degradation of at least one beam of the multiple different beam configurations.

19. The apparatus of claim 17, wherein the indication of beam correspondence is determined based on measurements of the at least one reference signal received power of the selected beam and a tilted angle beam.

20. The apparatus of claim 17, wherein the indication of beam correspondence is associated with a comparison to a threshold of the difference between the determined at least one delta gain of downlink received power and the determined at least one delta gain of uplink received power using the at least two beam configurations.

* * * * *